United States Patent [19]
Jeffes

[11] 4,147,374
[45] Apr. 3, 1979

[54] DRAWBAR

[75] Inventor: Robert H. F. Jeffes, Stroud, England

[73] Assignee: Jeffes Engineering Limited, Gloucestershire, England

[21] Appl. No.: 801,473

[22] Filed: May 31, 1977

[30] Foreign Application Priority Data

Jun. 5, 1976 [GB] United Kingdom ............... 23339/76

[51] Int. Cl.² .............................................. B60D 1/04
[52] U.S. Cl. .................................. 280/478 R; 280/504
[58] Field of Search ........... 280/504, 508, 510, 478 B, 280/478 R, 482, 461 A, 460 A, 456 A; 292/163, 138

[56] References Cited
U.S. PATENT DOCUMENTS

| | | | |
|---|---|---|---|
| 2,899,227 | 8/1959 | Gschwend | 292/163 |
| 3,384,937 | 5/1968 | Muncke et al. | 280/482 X |
| 3,437,355 | 4/1969 | Jeffes | 280/504 X |

Primary Examiner—John A. Pekar
Attorney, Agent, or Firm—Gifford, Chandler, Van Ophem, Sheridan & Sprinkle

[57] ABSTRACT

A drawbar having at one end thereof a hook member defining a recess into which a coupling member is to be inserted, and including a retaining pin movable in a socket in the hook member between a retaining position in which an outer end of the retaining pin extends from the socket to constrict the mouth of the recess to retain the coupling member in the recess, and a release position in which the retaining pin is retracted wholly into the socket against a spring to enable the coupling member to be removed from and inserted into the recess, and a stop to limit the outward movement of the retaining pin.

8 Claims, 8 Drawing Figures

DRAWBAR

FIELD OF THE INVENTION

The invention relates to a drawbar to be mounted on a tractor or other towing vehicle, hereinafter called a "tractor", the drawbar being of the kind having at its rearward end, that is the end remote from the tractor, a hook member defining a recess in which a coupling member attached to a trailer or implement is to be located, the mouth of the recess being constricted by a retaining pin which is temporarily displaceable against a spring force to permit access of the coupling member into the hook portion or removal of the coupling member from the hook portion and is then returned by the spring force to a position in which the retaining pin constricts the mouth of the hook portion to retain the coupling member in the hook, that is where the coupling member has first been placed in the hook portion.

DESCRIPTION OF THE PRIOR ART

U.S. Pat. No. 3,437,355 is concerned with a telescopic drawbar having a hook member of the kind described in which the retaining pin extends from the end of a throughway in the hook member remote from the mouth of the hook portion to enable the retaining pin to be withdrawn manually to a release position in which the coupling member can be removed from the hook portion. That arrangement has the disadvantage that said remote portion of the retaining pin extending from the throughway can obstruct the telescopic contraction of the drawbar or the retaining pin can become bent or be sheared off when the drawbar is contracted. Furthermore if the retaining pin of the aforesaid specification were to be applied to a drawbar of a non-telescopic type the said remote end of the retaining pin could become damaged or become caked with mud and could jam in its socket. An object of the invention is to overcome these disadvantages.

SUMMARY OF THE INVENTION

According to the present invention, a drawbar has at one end thereof a hook member defining a recess into which a coupling member having a convex outer surface is to be inserted, the walls of the recess being shaped to conform with the shape of the outer surface of the coupling member to permit the latter to turn in the recess, the drawbar also including a retaining pin movable in a socket in the hook member between a retaining position in which an outer end of the retaining pin extends from the socket to constrict the mouth of the recess and thereby, where the coupling member has been positioned in the recess, to retain the coupling member in the recess, and a release position in which the retaining pin is retracted wholly into the socket against spring means, acting to move the retaining pin to its retaining position, thereby to enable the coupling member to be removed from or inserted into the recess, and stop means to limit the outward movement of the retaining pin and hence to determine the position of the outer end of the retaining pin in its retaining position, whereby the face of the retaining pin adjacent the coupling member will be positioned to retain the coupling member in the recess without impairing its ability to turn in the recess and to enable the retaining pin to be retracted to its release position.

Conveniently, the stop means may comprise an elongate slot extending longitudinally of the retaining pin and a stop-pin arranged to be engaged by the respective ends of the elongate slot to determine the retaining and release positions of the retaining pin. The elongate slot may, for example, be formed in the retaining pin, the stop-pin extending into the slot from the hook member.

The face of the retaining pin which will be adjacent the coupling member, when a coupling member has been inserted into the recess and the retaining pin is in its retaining position, is desirably curved to conform to the outer surface of the coupling member and spaced from the coupling member when the latter is fully seated in the recess to provide clearance between the coupling member and the retaining pin.

Release means may be provided to move the retaining pin against the force of the spring means to the release position. The release means may be a lever pivotally mounted on the drawbar and arranged, as in the aforesaid specification, to be pivoted to engage the outer end of the retaining pin and to depress the latter against the force of the spring means into the release position. Alternatively or additionally to the lever, the release means may be a cable or rod attached to the retaining pin and operable to pull the retaining pin into the release position against the force of the spring means. Alternatively to providing the cable or rod, the release means may be a fluid operable device or be electrically or electro-magnectically operable. In yet a further arrangement, the release means may be any combination of the foregoing or other devices.

The spring means may be a compression spring positioned in the socket and acting on the inner end face of the retaining pin.

BRIEF DESCRIPTION OF THE DRAWING

By way of example, three drawbars in accordance with the invention are now described with reference to the accompanying drawings, in which.

DESCRIPTION OF THE PREFERRED EMBODIMENT

Referring to the FIGS. 1 to 5, the first drawbar comprises an outer tubular housing 1 in which an inner member 2 is telescopically slidable. The outer tubular housing 1 is carried by or is attached (for example by welding) to a drawbar arm 3 to be mounted on a tractor.

Figure 1:
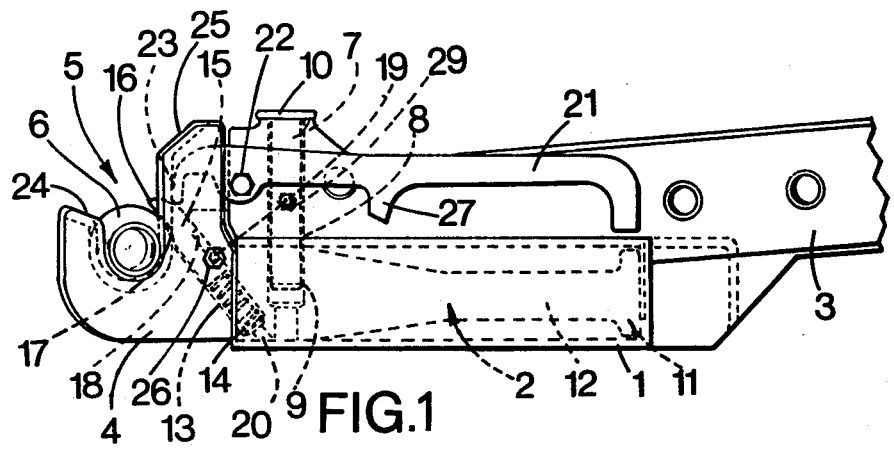
FIG. 1 is a side view, of the first drawbar which is of the telescopic type in the position in which the inner member thereof is fully retracted telescopically within the outer member of the drawbar and the hook member has a spherical coupling member therein.
Figure 2:
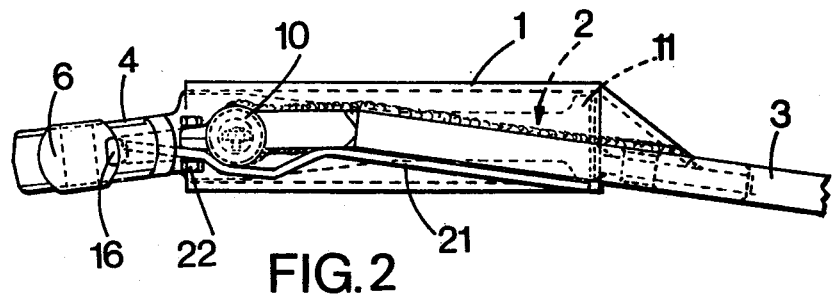
FIG. 2 is a plan view of the drawbar as shown in FIG. 1.
Figure 3:
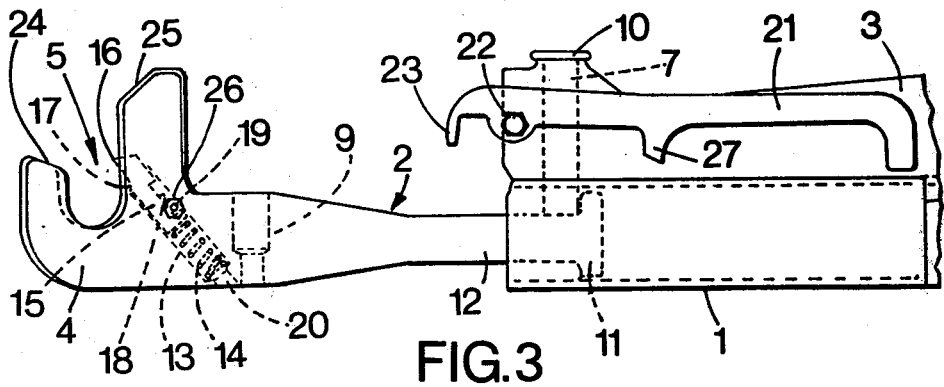
FIG. 3 is a view similar to FIG. 1 but showing the inner member fully extended telescopically from the outer member and without the spherical coupling member in the hook member.
Figure 4:
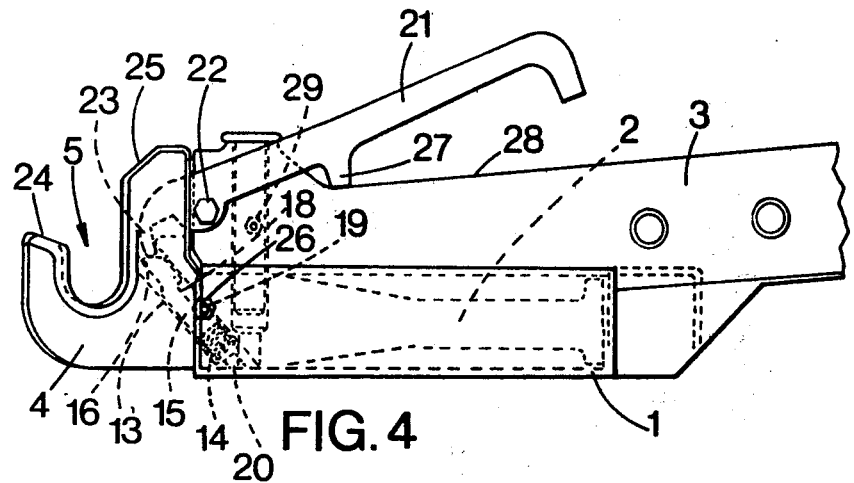
FIG. 4 is a view similar to FIG. 1 showing the retaining pin held in its retracted or release position.
Figure 5:
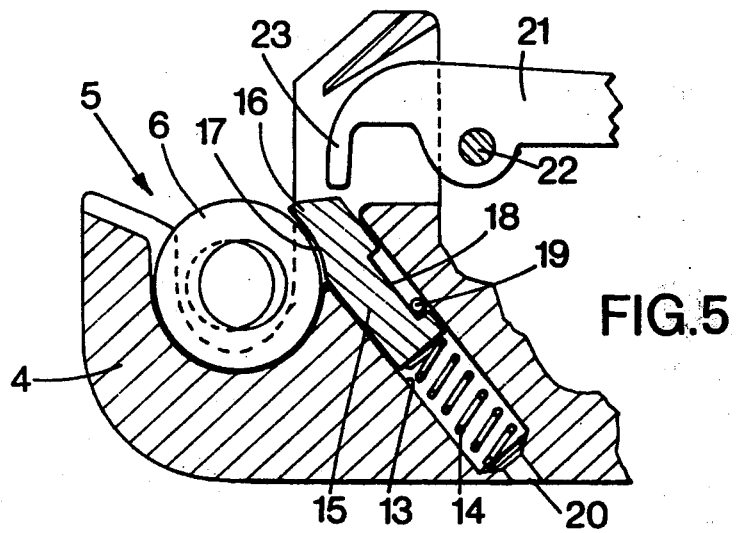
FIG. 5 is a part of FIG. 1 drawn to a larger scale and shown partly in section.

The outer end of the inner member 2 is in the form of a hook member 4 of which a hook portion 5 has part-spherical faces to receive a spherical coupling member indicated at 6 to be attached to a trailer or implement. The inner member 2 is held in its fully retracted position as illustrated in FIGS. 1 and 2 by a pin 7 extending through a hole 8 in upper wall of the housing 1 and the drawbar arm 3 and a throughway 9 in the inner member 2 and biased to the position illustrated by a spring (not shown). The pin 7 has a head 10 which can be lifted to withdraw the pin from the throughway 9 to permit the inner member 2 to be telescopically extended. A grease nipple 29 is provided to enable grease to be introduced into the hole 8 to lubricate the pin 7. The inner member 2 has an inner end 11 having a part-spherical peripheral surface and a neck portion 12 to permit movement of the inner member 2 in all directions laterally of the longitudinal axis of the tubular housing 1 when the inner member 2 has been telescopically extended from the housing 1. This facility is fully described in the aforesaid Patent Specification and in my earlier U.S. Pat. No. 3,361,446 and is not further described herein. The hook member 4 is inclined with respect to the longitudinal axis of the inner member 2 of the drawbar as shown in plan in FIG. 2.

The hook member 4 has a cylindrical socket 13 therein opening into the mouth of the hook portion 5. The socket 13 contains a helical compression spring 14 and a cylindrical retaining pin 15. The latter has an outer portion 16 which has a part-spherical face 17 shaped to embrace the spherical coupling member 6 and is normally held in the position illustrated in FIGS. 1-3 and particularly in FIG. 5, by the spring 14 in which the end face 17 of the outer portion 16 embraces the spherical face of the coupling member 6 and prevents the latter from being removed from the hook portion 5 but permits the coupling member 6 to be turned freely in the hook member 5. The diameter of the part-spherical face 17 of the outer end portion 16 of the retaining pin 15 is slightly larger than that of the spherical surface of the coupling member 6 to permit the latter to turn freely without jamming and also to enable the retaining pin 15 to be retracted when the coupling member 6 is to be released. The hook portion 5 has outwardly-flared side walls 24 and 25 which guide the coupling member 6 into the mouth of the hook portion 5, the retaining pin 15 being displaceable against the force of the spring 14 as the coupling member 6 enters the hook portion 5. Then the spring 14 will automatically return the retaining pin 15 to its operative position in which the outer end 16 of the retaining pin 15 prevents removal of the coupling member 6 from the hook portion 5. The walls of the hook portion 5 are of part-spherical shape complementary to the coupling member 6, whereby the latter is snugly held in the hook portion 5 and can turn therein to permit required movement of the trailer or implement with respect to the drawbar. The longitudinal movement of the retaining pin 15 between the fully-extended, retaining position and the fully-retracted, release position is limited by providing a longitudinally-extending slot 18 in the retaining pin 15. The slot contains a stop-pin 19 carried by the hook member 4. The respective ends of the slot 18 are engageable with the stop pin 19 to limit the longitudinal movement of the retaining pin 15. The stop-pin 19 is so positioned that when it is engaged by the lower end of the slot 18, as viewed in FIGS. 1 and 5, the part-spherical face 17 of the outer end portion 16 of the retaining pin 15 is correctly spaced from the coupling member 6 to permit the latter to turn without jamming to prevent the retaining pin 15 from twisting in its socket and also to discourage dirt from becoming trapped between the retaining pin 15 and the coupling member 6. The socket 13 has a through-hole 20 at its inner end. This acts as a vent for air displaced by the retaining pin 15 to permit movement of the retaining pin 15 in the socket 13 and also as a drain through which dirt, slurry and water or like foreign matter can leave the socket. An advantage of this arrangement over that shown in U.S. Pat. No. 3,437,355 in which the retaining pin is extendible at each end thereof from the hook member is that there is less possibility of damage to the retaining pin 15 and each time the inner member 2 is slid telescopically into or out of the housing 1, dirt will be removed by a wiping movement from the through-hole 20. A grease nipple is provided to introduce grease into the socket 13 to lubricate the pin 15. The grease nipple 26 may, for example be provided at an end of a throughway in the stop-pin 19.

Instead of the slot 18 being formed in the peripheral surface of the retaining pin 15, the slot may extend transversely through the retaining pin 15 and the stop pin 19 in that case extending through the slot. Although the stop-pin 19 extends perpendicularly to the plane of FIG. 1 it may alternatively project at right angles to that direction into the slot 18. Alternatively the slot may be formed in the peripheral wall of the socket and the stop-pin may extend laterally from the retaining pin into the slot. In yet another possible variation instead of providing the slot 18, the retaining pin 15 may be provided with a flanged head which is engagable with the stop-pin 19 to limit the outward travel of the retaining pin 15 by the force of the spring 14 and hence to determine the correct clearance between the part-spherical force 17 and the coupling member 6.

As in the construction described in U.S. Pat. No. 3,437,355 the housing 1 carries a lever 21 pivoted thereto by a bolt 22. The lever has a nose portion 23 which extends over the outer end 16 of the retaining pin 15. On pivoting the lever 21 in the anti-clockwise direction as shown in FIG. 1 to the position shown in FIG. 4, the nose portion 23 depresses the retaining pin 15 and moves it to the retracted, release position to enable the coupling member 6 to be removed from the hook member 4. The lever 21 has a protrusion 27 extending downwardly from its underneath edge, as viewed in FIGS. 1,3 and 4, and the whole lever can be displaced sideways against a transverse spring (not shown) on the pivot bolt 22 so that the protrusion 27 can be rested on the top edge 28 of the arm 3 to hold the retaining pin 15 in its retracted position. On dislodging the protrusion 27 from the top edge 28 of the arm 3, the arm 21 will be returned to its position, shown in FIG. 2, by the transverse spring on the bolt 22 and the arm 21 will be returned to the position shown in FIG. 1 by the outward movement of the retaining pin 15 under the action of the spring 14 and so the retaining pin 15 will re-assume its retaining position.

Figure 6:
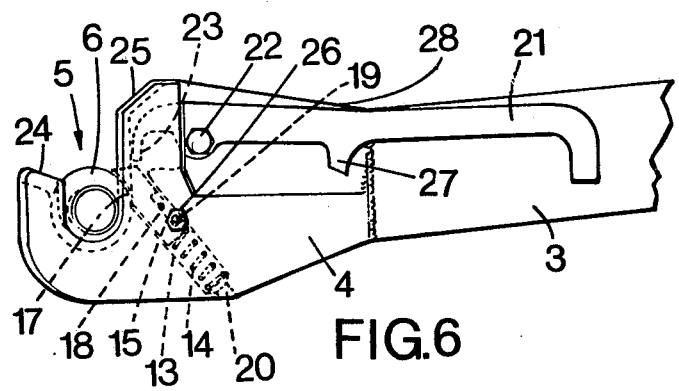
FIG. 6 is a side view similar to FIG. 1 of the second drawbar which is of the non-telescopic type.
Figure 7:
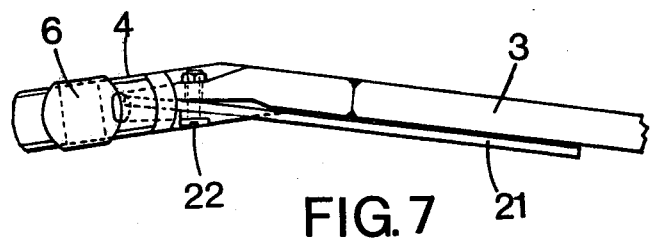
FIG. 7 is a plan view similar to FIG. 2 of the second drawbar.

As aforesaid, the drawbar in accordance with the invention may also be of the non-telescopic type where the telescopic member 2 and the housing 1 are not provided. In that case, the hook member 4 would be integral with or fixed directly to the arm 3. This is shown in FIGS. 6 and 7, where the same reference numerals have been used for parts which also appear in the drawbar illustrated in FIGS. 1 to 5. In FIGS. 6 and 7, the drawbar illustrated comprises an arm 3 to be attached to the tractor and the hook member 4 which is welded or otherwise secured to the rearward end of the arm 3, or may be formed integrally with the arm 3. As in the drawbar shown in FIGS. 1 to 5 the hook member 4 defines a hook portion 5 having a flared mouth at 24 and 25 and providing a part-spherical seat for a spherical coupling member 6. The hook member 4 has a cylindrical socket 13 therein containing the retaining pin 15 which is slidable in the socket between two limiting positions determined by one or other of the ends of the control slot 18 engaging the stop-pin 19 carried by the hook member 4. The retaining pin 15 is urged into its retaining position by the helical compression spring 14 positioned in the socket 13 beneath the retaining pin 15, all as in the first drawbar shown in FIGS. 1 to 5. As in the first drawbar, the socket 13 has at its lower end the through-hole 20 which acts as a vent for air displaced by the retaining pin 15 and as a drain. A grease nipple 26 is also provided at an end of the stop-pin 19 or adjacent the stop-pin 19 to permit grease to be introduced into the socket 13 to lubricate the retaining pin 15. As in the first drawbar, the retaining pin is moved to its retracted or release position by the lever 21 which is pivotally mounted on the hook member 4 at pivot bolt 22 and has a nose portion 23 which presses the retaining pin 15 inwardly into the socket 13, when the lever 21 is lifted and turned in the anti-clockwise direction from the position shown in FIG. 6. The lever 21 may be moved sideways against a spring on the pivot bolt 22 to bring the protrusion 27 into a position in which it rests on the upper edge 28 of the hook member 4 or of the arm 3. As in the first drawbar, the retaining pin 15 has a part-spherical face 17 which is curved to embrace the coupling member 6 and is located by the lower end of the slot 18 engaging the stop-pin 19 in a position which will retain the coupling member 6 in the hook portion 5 but will permit the coupling member 6 to turn in the hook portion 5 and will discourage the collection of dirt between the coupling member 6 and the retaining pin 15. As the coupling member 6 does not become wedged against the retaining pin 15 the latter can be depressed to its retracted or release position by lifting the lever 21.

Figure 8:
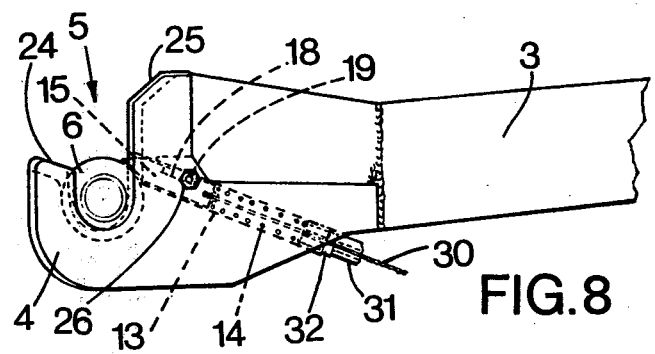
FIG. 8 is a side view similar to FIG. 1 or FIG. 6 of the third drawbar, which may be of either telescopic or non-telescopic type, in which the retaining pin is retractable by means of a cable.

Alternatively, or additionally, to using or providing the lever 21, in either of the drawbars described hereinbefore, the retaining pin 15 may be retracted in its socket by other mechanical devices, such as a cable or pull-rod. For example, a Bowden type of cable may be used. FIG. 8 shows an arrangement in which the wire 30 of a Bowden type of cable is attached to the retaining pin 15 and the sheath 31 of the cable is attached, e.g., by a screw-thread to a hole or screwed spigot 32 in the hook member 4. The spring 14 would be provided as in the aforegoing drawbars to urge the retaining pin 15 to its retaining position. On pulling the cable 30, e.g. by a lever at a remote position, such as the cab of the tractor, the retaining pin 15 is pulled against the force of the spring 14 to the retracted or release position. The control slot 18 and stop-pin 19 would be provided as before. As the direction of pulling the cable would be forwardly towards the tractor rather than downwardly the inclination of the longitudinal axis of the socket 13 to the longitudinal direction of the arm 3 would be less, as shown in FIG. 8, than that shown in FIGS. 1 and 6.

Although other ways of retracting the retaining pin 15 have not been illustrated, the retaining pin may alternatively be retracted by other means, for example by a hydraulic, pneumatic or other fluid operable actuator or by an electrical or electro-magnetic actuator or any combination or such actuators or any other retracting means.

What I claim as my invention and desire to secure by Letters Patent of the United States is:

1. A drawbar having an arm by which the drawbar is to be attached to a tractor and at one end of said arm a hook member defining a recess into which a coupling member having a convex outer surface is to be inserted, the walls of the recess conforming with the shape of the outer surface of the coupling member to permit the latter to turn in the recess, the drawbar also including a retaining pin having an outer end and an inner end and movable in a socket in the hook member between a retaining position in which said outer end of the retaining pin extends from the socket to constrict the mouth of the recess and thereby, where the coupling member has been positioned in the recess, to retain the coupling member in the recess, and said inner end is located within the socket, and a release position in which said outer end of said retaining pin is retracted into the socket and said inner end also remains located within the socket, spring means engaging said retaining pin to move the retaining pin to its retaining position, and thereby to enable the coupling member to be removed from and inserted into the recess, stop means to limit the outward movement of the retaining pin and hence to determine the position of the outer end of the retaining pin in its retaining position, and release means to move the retaining pin against the force of the spring means to said release position, said release means comprising a lever pivotally mounted on said arm to engage said outer end of said retaining pin to depress said retaining pin against the force of said spring means into said release position.

2. A drawbar as claimed in claim 1 in which the stop means comprises an elongate slot extending longitudinally of the retaining pin and a stop-pin engageable by the respective ends of the elongate slot to determine the retaining and release positions of the retaining pin.

3. A drawbar as claimed in claim 2 in which the elongate slot is formed in the retaining pin and the stop-pin extends into the slot from the hook member.

4. A drawbar as claimed in claim 1 in which the spring means is a compression spring positioned in the socket and acting on said inner end of the retaining pin.

5. A drawbar as claimed in claim 1 in which the drawbar is of the telescopic kind and comprises an outer member carried by said arm and an inner member slidable telescopically within said outer member and having said hook member formed at the end of said inner member remote from said outer member.

6. A drawbar as claimed in claim 5 in which the inner member has a neck portion intermediate its inner and outer ends with respect to said outer member, said neck portion permitting universal swivelling of said inner member with respect to the outer member, when said inner member is in its extended position.

7. A drawbar having at one end thereof a hook member defining a recess into which a coupling member having a convex outer surface is to be inserted, the walls of the recess conforming with the shape of the outer surface of the coupling member to permit the latter to turn in the recess, the drawbar also including a retaining pin having an outer end and an inner end movable in a socket in the hook member between a retaining position in which said outer end of the retaining pin extends from the socket to constrict the mouth of the recess and thereby, where the coupling member has been positioned in the recess, to retain the coupling member in the recess, and said inner end is located within the socket, and a release position in which said outer end of said retaining pin is retracted into the socket and said inner end also remains located within the socket, spring means engaging said retaining pin to move the retaining pin to its retaining position, and thereby to enable the coupling member to be removed from and inserted into the recess, stop means to limit the outward movement of the retaining pin and hence to determine the position of the outer end of the retaining pin in its retaining position, and release means to move the retaining pin against the force of the spring means to said release position, and said release means including manually-operated means engaging one of said outer and inner ends of said retaining pin to move said retaining pin into said release position against the force of said spring means.

8. A drawbar having at one end thereof a hook member defining a recess into which a coupling member having a convex outer surface is to be inserted, the walls of the recess conforming with the shape of the outer surface of the coupling member to permit the latter to turn in the recess, the drawbar also including a retaining pin having an outer end and an inner end and movable in a socket in the hook member between a retaining position in which said outer end of the retaining pin extends from the socket to constrict the mouth of the recess and thereby, where the coupling member has been positioned in the recess, to retain the coupling member in the recess, and said inner end is located within the socket, and a release position in which said outer end of said retaining pin is retracted into the socket and said inner end also remains located within the socket, spring means engaging said retaining pin to move the retaining pin to its retaining position, and thereby to enable the coupling member to be removed from and inserted into the recess, stop means to limit the outward movement of the retaining pin and hence to determine the position of the outer end of the retaining pin in its retaining position, and release means to move the retaining pin against the force of the spring means to said release position, said release means comprising a cable attached to said retaining pin to pull said retaining pin into said release position against the force of said spring means.

* * * * *

UNITED STATES PATENT AND TRADEMARK OFFICE
CERTIFICATE OF CORRECTION

PATENT NO. : 4,147,374
DATED : April 3, 1979
INVENTOR(S) : Robert Henry Francis Jeffes It is certified that error appears in the above-identified patent and that said Letters Patent are hereby corrected as shown below:

Column 2, line 27, delete "magnectically" and insert --magnetically-- therefor;

Column 6, line 2, delete "acturators" and insert --actuators-- therefor.

Signed and Sealed this

Eighteenth Day of September 1979

[SEAL]

Attest:

Attesting Officer

LUTRELLE F. PARKER
Acting Commissioner of Patents and Trademarks